United States Patent
Lee et al.

(10) Patent No.: US 11,052,713 B2
(45) Date of Patent: Jul. 6, 2021

(54) MOBILITY CONNECTION SYSTEM

(71) Applicants: Hyundai Motor Company, Seoul (KR); Kia Motors Corporation, Seoul (KR)

(72) Inventors: Sang Heon Lee, Seoul (KR); Jin Ho Hwang, Seoul (KR); Dong Eun Cha, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 137 days.

(21) Appl. No.: 16/673,716

(22) Filed: Nov. 4, 2019

(65) Prior Publication Data
US 2020/0338939 A1    Oct. 29, 2020

(30) Foreign Application Priority Data
Apr. 23, 2019    (KR) .......................... 10-2019-0047565

(51) Int. Cl.
*B60D 1/00*    (2006.01)
*B60D 1/48*    (2006.01)

(52) U.S. Cl.
CPC ................ *B60D 1/483* (2013.01); *B60D 1/00* (2013.01)

(58) Field of Classification Search
CPC ........ B62K 13/06; B60D 1/486; B60D 1/483; B62D 47/006
See application file for complete search history.

(56) References Cited

U.S. PATENT DOCUMENTS

| | | | | |
|---|---|---|---|---|
| 4,227,589 A | * | 10/1980 | Chika | ................... B62K 13/06 180/205.7 |
| 5,511,809 A | * | 4/1996 | Sagi | ...................... B62K 13/06 280/209 |

FOREIGN PATENT DOCUMENTS

| CN | 101670869 A | 3/2010 | |
|---|---|---|---|
| CN | 206579728 U | 10/2017 | |
| JP | 05-076992 U | 10/1993 | |
| KR | 10-2011-0047534 A | 5/2011 | |
| KR | 10-2018-0047271 A | 5/2018 | |
| WO | WO-2007062640 A2 * | 6/2007 | ............. B62D 59/04 |

* cited by examiner

*Primary Examiner* — Kevin Hurley
(74) *Attorney, Agent, or Firm* — Morgan, Lewis & Bockius LLP

(57) ABSTRACT

A mobility connection system including a left driveshaft and a right driveshaft having an internally hollow shaft shape, and connected to a left wheel portion and a right wheel portion, respectively; a connection shaft having a shaft shape provided inside the left driveshaft or inside the right driveshaft, and slid to the outside of a vehicle to be inserted into and coupled to the inside of the driveshaft of another vehicle which is disposed adjacent to the side thereof when the vehicle is laterally coupled to another vehicle; and a wheel detecting sensor provided at the left side or the right side of the vehicle, and for detecting whether the driveshafts facing each other when the vehicle is coupled to another vehicle have been aligned with each other or the spacing distance therebetween is formed.

15 Claims, 5 Drawing Sheets

MOBILITY CONNECTION SYSTEM

CROSS REFERENCE TO RELATED APPLICATION

The present application claims priority to Korean Patent Application No. 10-2019-0047565 filed on Apr. 23, 2019, the entire contents of which is incorporated herein for all purposes by this reference.

BACKGROUND OF THE DISCLOSURE

Field of the Disclosure

The present invention relates to a mobility connection system that enables coupling traveling by coupling a vehicle with another vehicle in the field of mobility.

Description of Related Art

As an electric vehicle develops, an ultra-small mobility is presented. The ultra-small mobility includes a single seat or two seats. Due to limitations in the engine capacity of the electric vehicle, the ultra-small mobility is expected to be used mainly for short distance such as commuting or mart use. However, in some cases, there may be a situation where a long-distance operation is required.

In the instant case, a long distance traveling with the ultra-small mobility may cause various burdens such as a battery problem or fatigue due to the long-distance operation. In the present situation, when the ultra-small mobility is coupled with another ultra-small mobility, the necessity of the group traveling is emerged in terms of sharing the battery and determining the driver.

However, until now, the focus is only on the hardware development of the ultra-small mobility, and the concept of the group traveling or the collective traveling is not presented.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a mobility connection system that enables coupling traveling by coupling a vehicle with another vehicle in the field of mobility.

A mobility connection system according to an exemplary embodiment of the present invention for achieving the object may include a left driveshaft and a right driveshaft having an internally hollow shaft shape, and connected to a left wheel portion and a right wheel portion, respectively; a connection shaft having a shaft shape provided inside the left driveshaft or inside the right driveshaft, and slid to the outside of a vehicle to be inserted into and coupled to the inside of the driveshaft of another vehicle which is disposed adjacent to the side thereof when the vehicle is laterally coupled to another vehicle; and a wheel sensing sensor provided at the left side or the right side of the vehicle, and for detecting whether the driveshafts facing each other when the vehicle is coupled to another vehicle have been aligned with each other or the spacing distance therebetween is formed.

The connection shaft may be provided at the right driveshaft, and slid to the outside of the vehicle to be inserted into and coupled to the inside of the left driveshaft of another vehicle when the vehicle is coupled to another vehicle.

When the connection shaft has been inserted into and coupled to the inside of the left driveshaft of another vehicle, the right driveshaft of the vehicle and the left driveshaft of another vehicle may be lifted upwards so that the right wheel portion of the vehicle and the left wheel portion of another vehicle are spaced from the ground surface.

The connection shaft may be provided at the left driveshaft, and slid to the outside of the vehicle to be inserted into and coupled to the inside of the right driveshaft of another vehicle when the vehicle is coupled to another vehicle.

When the connection shaft has been inserted into and coupled to the inside of the right driveshaft of another vehicle, the left driveshaft of the vehicle and the right driveshaft of another vehicle may be lifted upwards so that the left wheel portion of the vehicle and the right wheel portion of another vehicle are spaced from the ground surface.

The wheel sensing sensor may be provided in plural at each of the left wheel portion and the right wheel portion of the vehicle, and an electronic signal may be mutually transmitted and received between the corresponding wheel sensing sensors to detect whether the driveshafts have been aligned with each other or the spacing distance therebetween when the vehicle is coupled to another vehicle.

The plurality of wheel sensing sensors may have the same angles formed between the adjacent wheel sensing sensors on the left wheel portion and the right wheel portion of the vehicle.

The mobility connection system may further include an integrated control portion for controlling an operation of the left driveshaft, the right driveshaft, or the connection shaft, and determining whether the driveshafts have been aligned with each other or the spacing distance therebetween through the wheel sensing sensor.

When the connection shaft has been provided at the right driveshaft of the vehicle, the integrated control portion may control the operations of the left driveshaft and the right driveshaft of the vehicle so that the right driveshaft of the vehicle and the left driveshaft of another vehicle are aligned with each other when the vehicle is coupled to another vehicle.

When the connection shaft has been provided at the left driveshaft of the vehicle, the integrated control portion may control the operations of the left driveshaft and the right driveshaft of the vehicle so that the left driveshaft of the vehicle and the right driveshaft of another vehicle are aligned with each other when the vehicle is coupled to another vehicle.

The integrated control portion may control so that the connection shaft of the vehicle slides to the outside of the vehicle to be inserted into and coupled to the inside of the driveshaft of another vehicle which is disposed adjacent to the side thereof only when the driveshafts of the vehicle and another vehicle have been aligned with each other via the wheel detecting sensor.

The integrated control portion may control so that the connection shaft of the vehicle slides to the outside of the vehicle to be inserted into and coupled to the inside of the driveshaft of another vehicle which is disposed adjacent to the side thereof only when a spacing distance between the driveshafts of the vehicle and another vehicle is equal to or smaller than a certain distance via the wheel detecting sensor.

When the vehicle has the operating authority, the integrated control portion may control the operations of the left driveshaft and the right driveshaft of the vehicle and the left driveshaft and the right driveshaft of another vehicle when the vehicle is coupled to another vehicle.

If another vehicle is traveling when the vehicle is coupled to another vehicle, the integrated control portion may equally keep the rotation speeds of the left driveshaft and the right driveshaft of another vehicle, and control the rotation speeds of the left driveshaft and the right driveshaft of the vehicle so that the driveshafts of the vehicle and another vehicle are aligned with each other.

The integrated control portion may control so that the connection shaft of the vehicle slides to the outside of the vehicle to be inserted into and coupled to the inside of the driveshaft of another vehicle which is disposed adjacent to the side thereof only when the vehicle and another vehicle may perform the straight traveling together for a certain distance or a certain time.

According to the mobility connection system of the present invention, it is possible to couple the vehicle with another vehicle, facilitating the coupling traveling.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
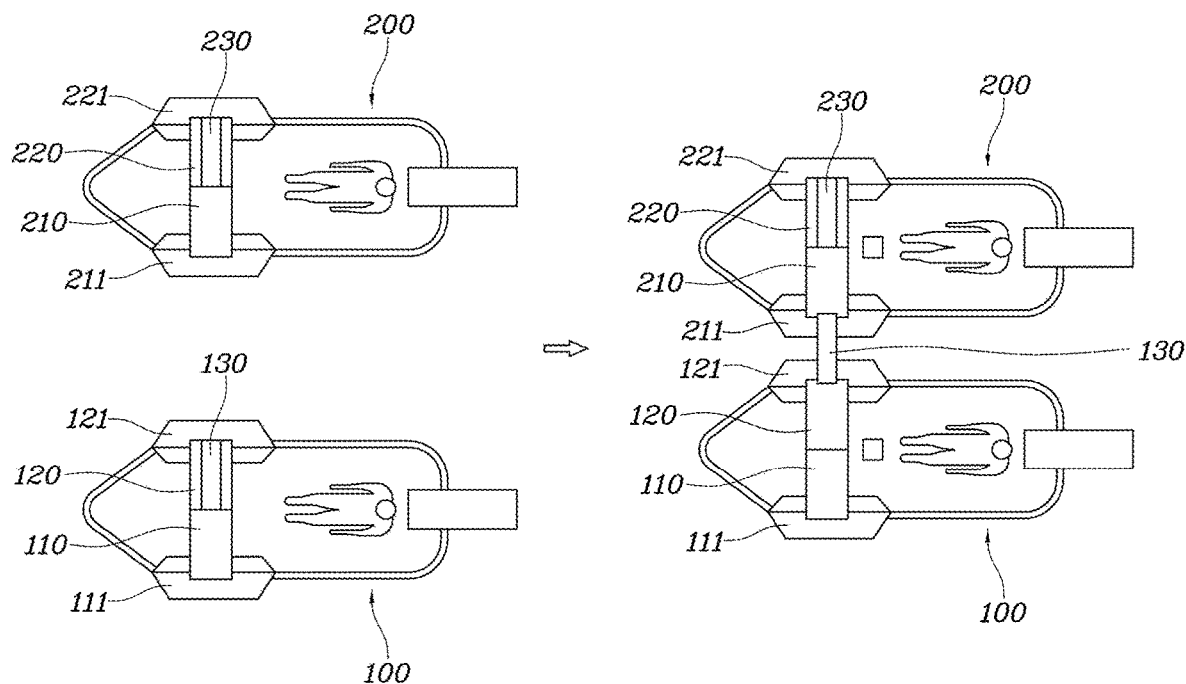
FIG. 1 is a diagram illustrating before and after a vehicle is connected to another vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION OF THE DISCLOSURE

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Figure 2:
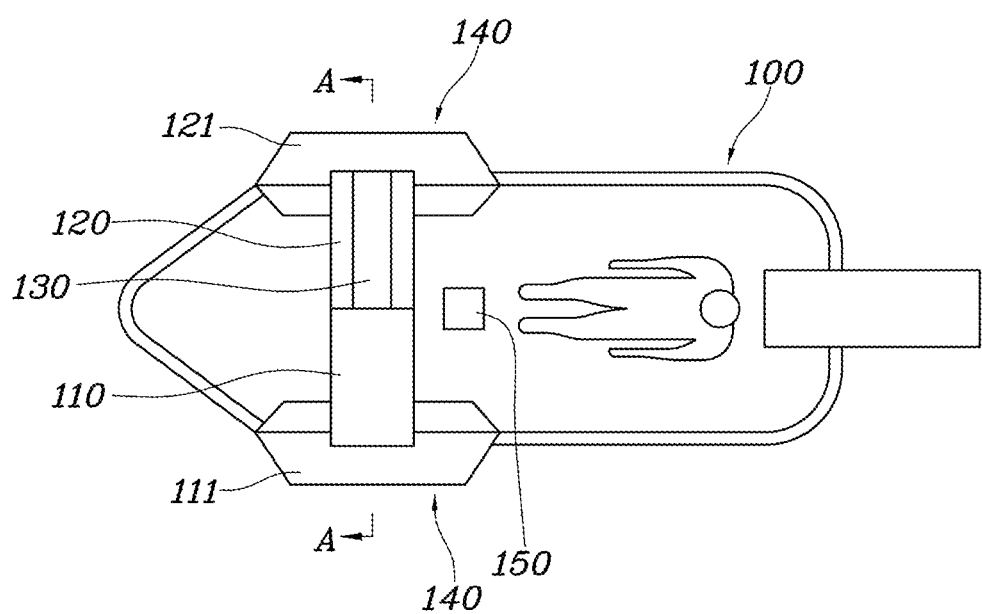
FIG. 2 is a diagram illustrating a configuration of a vehicle according to an exemplary embodiment of the present invention.
Figure 3:
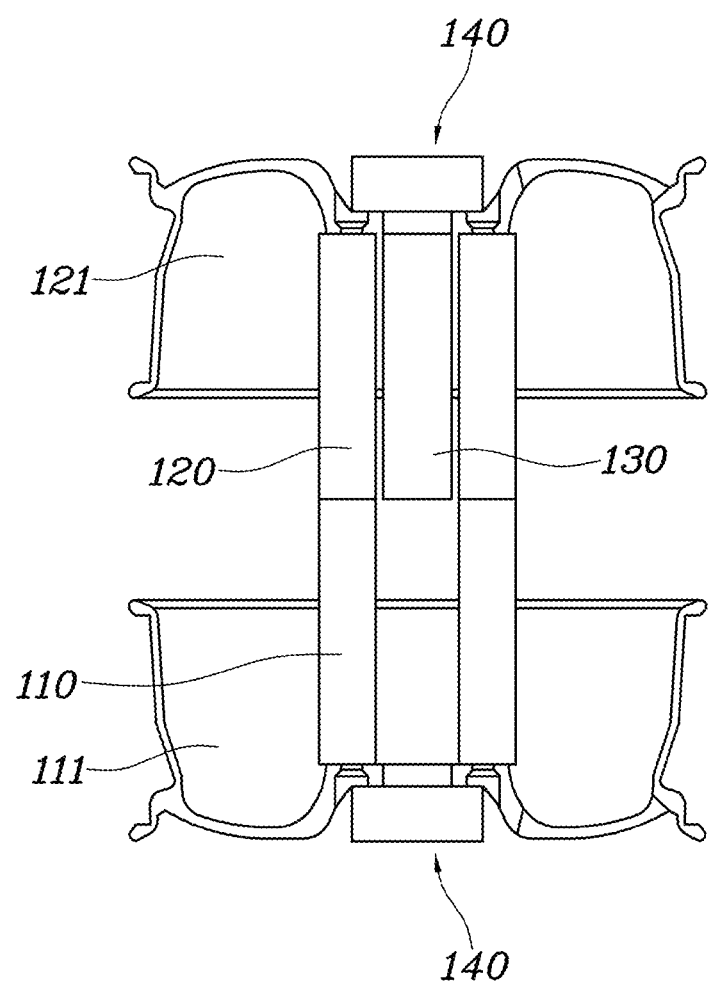
FIG. 3 is a diagram taken along the line A-A of FIG. 2.
Figure 4:
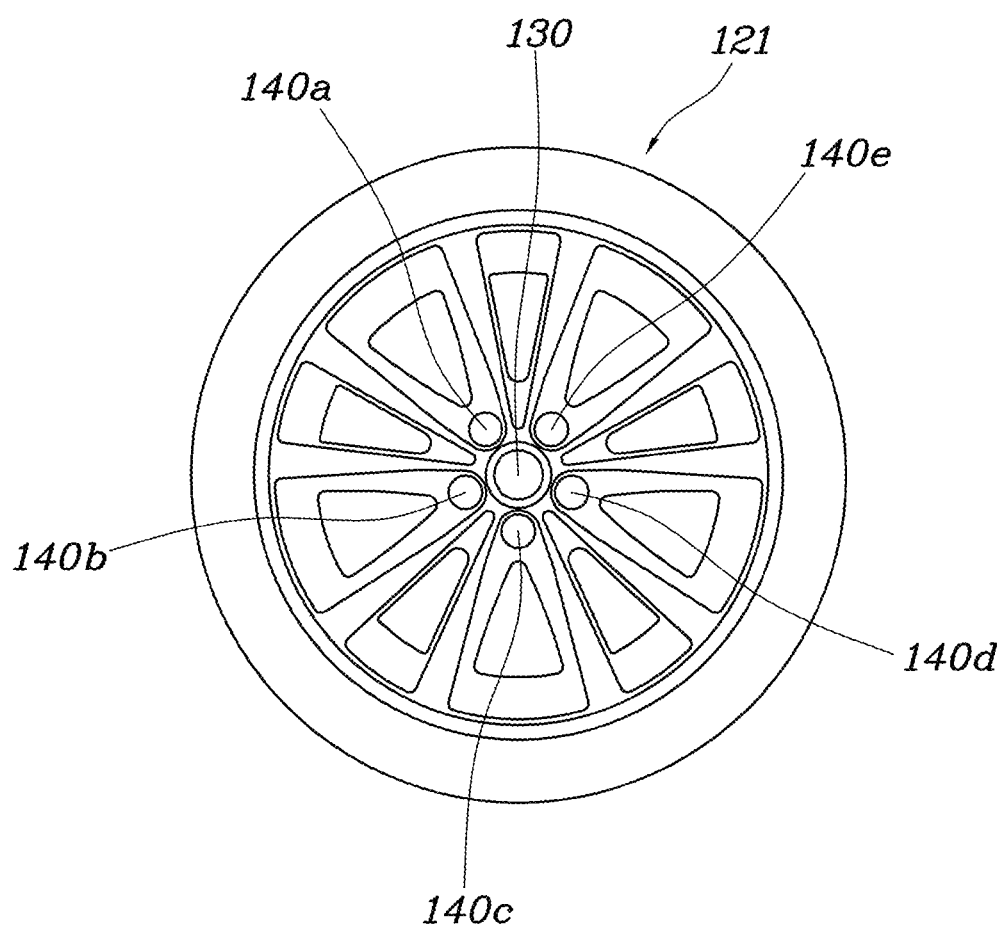
FIG. 4 is a diagram illustrating a wheel detecting sensor of a mobility connection system according to an exemplary embodiment of the present invention.
Figure 5:
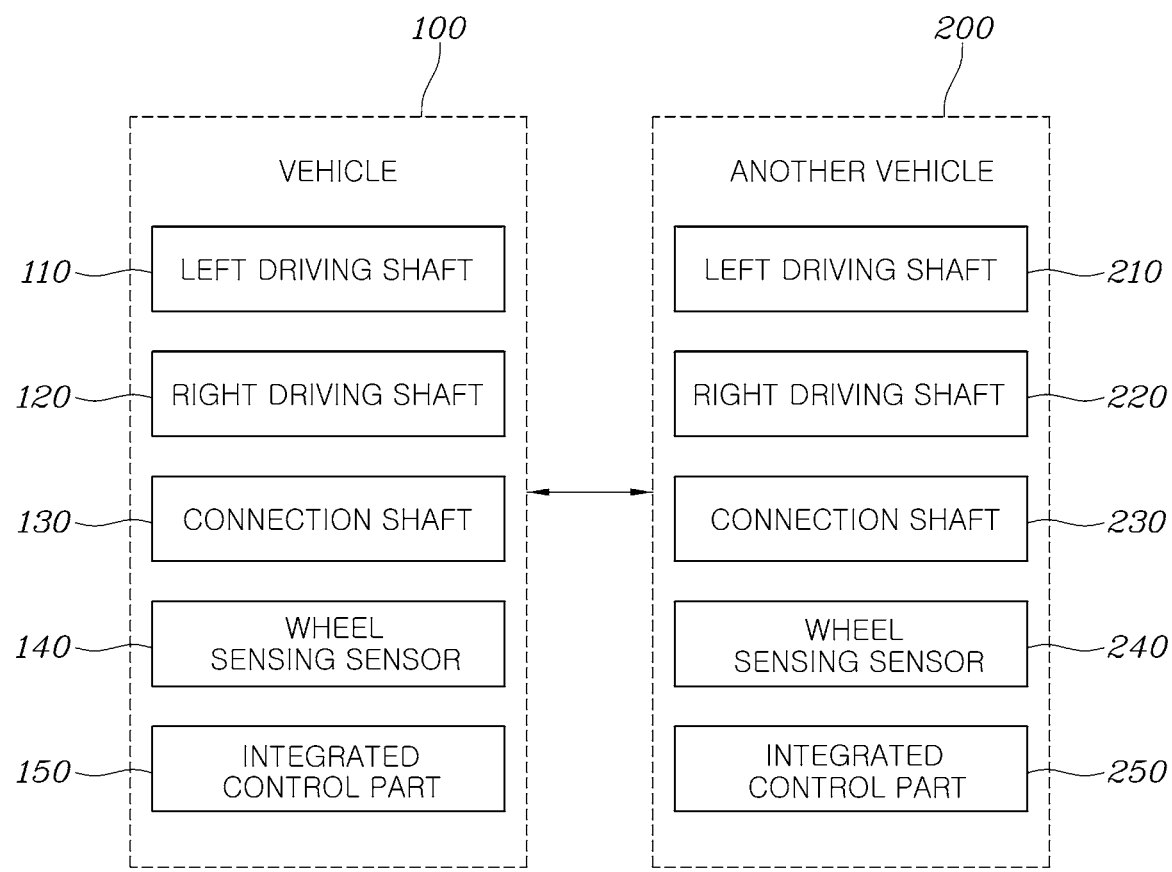
FIG. 5 is a concept diagram of the vehicle and another vehicle of the mobility connection system according to an exemplary embodiment of the present invention.

FIG. 1 is a diagram illustrating before and after a vehicle is connected to another vehicle according to an exemplary embodiment of the present invention, FIG. 2 is a diagram illustrating a configuration of a vehicle according to an exemplary embodiment of the present invention, FIG. 3 is a diagram taken along the line A-A of FIG. 2, FIG. 4 is a diagram illustrating a wheel detecting sensor of a mobility connection system according to an exemplary embodiment of the present invention, and FIG. 5 is a concept diagram of the vehicle and another vehicle of the mobility connection system according to an exemplary embodiment of the present invention.

Referring to FIG. 1 and FIG. 2, a mobility connection system according to an exemplary embodiment of the present invention includes a left driveshaft 110 and a right driveshaft 120 having an internally hollow shaft shape, and connected to a left wheel portion 111 and a right wheel portion 121, respectively; a connection shaft 130 having a shaft shape provided inside the left driveshaft 110 or inside the right driveshaft 120, and slid to the outside of a vehicle 100 to be inserted into and coupled to the inside of the driveshaft of another vehicle 200 adjacent to the side thereof when the vehicle 100 is laterally coupled to another vehicle 200; and a wheel detecting sensor 140 provided at the left side or the right side of the vehicle 100, and for detecting whether the driveshafts facing each other when the vehicle 100 is coupled to another vehicle 200 have been aligned with each other or the spacing distance therebetween is formed.

Hereinafter, the "vehicle 100" refers to one's own vehicle, and the "another vehicle 200" refers to peripheral other vehicles fastened thereto.

FIG. 1 is a diagram illustrating before and after a vehicle is connected to another vehicle according to an exemplary embodiment of the present invention.

The present invention is provided with the left driveshaft 110 and the right driveshaft 120 having the internally hollow shaft shape. As illustrated, the left driveshaft 110 and the right driveshaft 120 are connected to the left wheel portion 111 and the right wheel portion 121, respectively. The present invention may also be applied to a conventional internal combustion engine vehicle, etc., and also applied to the latest mobility vehicle such as an electric vehicle. The left driveshaft is connected to a motor, etc. to transfer the driving force of the motor, etc. to the left wheel portion. This is also applied to the right driveshaft. Meanwhile, in an exemplary embodiment of the present invention, the left driveshaft 110 and the right driveshaft 120 are provided with an in-wheel motor, respectively so that the left wheel portion 111 and the right wheel portion 121 are independently controlled, but the present invention is not limited thereto. Meanwhile, the connection shaft 130 provided inside the left driveshaft 110 or inside the right driveshaft 120 is prepared. The connection shaft 130 is provided at any one of the inside of the left driveshaft 110 and the inside of the right driveshaft 120, and slid to the outside of the vehicle 100 to be inserted into and coupled to the inside of the driveshaft of another vehicle 200 adjacent to the side thereof when the vehicle 100 is laterally coupled to another vehicle 200.

For example, when the connection shaft has been provided inside the right driveshafts of the vehicle and another vehicle, the connection shaft provided inside the right driveshaft of the vehicle slides to the outside of the vehicle to be inserted into and coupled to the inside of the left driveshaft of another vehicle which is disposed adjacent to the side thereof when the vehicle is laterally coupled to another vehicle. This is the same even in the case where the connection shaft has been provided inside the left driveshafts of the vehicle and another vehicle.

Although FIG. 1, FIG. 2, and FIG. 3 illustrate that the connection shaft 130 is provided inside the right driveshaft 120 of the vehicle 100, the connection shaft 130 may also be provided inside the left driveshaft 110 of the vehicle 100.

Referring to FIG. 1, the connection shaft 130 is provided inside the right driveshaft 120 of the vehicle 100, and the connection shaft 130 slides to the outside of the vehicle 100 to be inserted into and coupled to the internal to a left driveshaft 210 of another vehicle 200 adjacent to the side thereof when the vehicle 100 is laterally coupled to another vehicle 200. In the instant case, since the inside of the left driveshaft 210 of another vehicle 200 is empty, the connection shaft 130 of the vehicle 100 may be slid to the outside of the vehicle 100 to be inserted into the inside of the left driveshaft 210 of another vehicle 200. In the instant case, threads are provided at the insides of the left driveshaft 110 and the right driveshaft 120 of the vehicle 100 and the insides of the left driveshaft 210 and a right driveshaft 220 of another vehicle 200, and the connection shaft 130 of the vehicle 100 is rotated by an electric motor and slid to the outside of the vehicle 100 along the thread of the right driveshaft 120 of the vehicle 100. As such, the connection shaft 130 of the vehicle 100 may be inserted into the left driveshaft 210 of another vehicle 200 along the thread to be coupled to the inside of the left driveshaft 210 of another vehicle 200. Furthermore, a mechanical locking device or a locking device using an electromagnet, etc. other than the thread may also be used for fastening the vehicle 100 and another vehicle 200. This is the same even in the case where the connection shaft 130 has been provided inside the left driveshaft 110 of the vehicle 100 to be inserted into and coupled to the inside of the right driveshaft 220 of another vehicle 200.

Meanwhile, the present invention is provided with the wheel detecting sensor 140 so that the connection shaft 130 of the vehicle 100 may be accurately inserted into the inside of the driveshaft of another vehicle 200 when the vehicle 100 is coupled to another vehicle 200. The wheel detecting sensor 140 is provided in the left side or the right side of the vehicle 100, and detects whether the driveshafts facing each other when the vehicle 100 is coupled to another vehicle 200 have been aligned with each other or the spacing distance therebetween is formed. Hereinafter, the case where the connection shaft 130 has been provided inside the right driveshaft 120 of the vehicle 100 to be inserted into and coupled to the inside of the left driveshaft 210 of another vehicle 200 will be described. In the instant case, the connection shaft 130 of the vehicle 100 may be accurately inserted into the inside of the left driveshaft 210 of another vehicle 200 only when the right driveshaft 120 of the vehicle 100 and the left driveshaft 210 of another vehicle 200 are placed on the same line. If the right driveshaft of the vehicle and the left driveshaft of another vehicle are not placed on the same line, there is a risk that the connection shaft of the vehicle interferes with the left wheel portion of another vehicle when sliding, damaging the connection shaft of the vehicle and the left wheel portion of another vehicle. Therefore, the wheel detecting sensor 140 is provided in the right side of the vehicle 100 to detect whether the right driveshaft 120 of the vehicle 100 and the left driveshaft 210 of another vehicle 200 have been placed on the same line to be aligned with each other.

As such, when the spacing distance between the right driveshaft 120 of the vehicle 100 and the left driveshaft 210 of another vehicle 200 is too long, the connection shaft 130 of the vehicle 100 may not be inserted into the inside of the left driveshaft 210 of another vehicle 200. Therefore, the wheel detecting sensor 140 detects whether the spacing distance between the right driveshaft 120 of the vehicle 100 and the left driveshaft 210 of another vehicle 200 is a distance at which the connection shaft 130 of the vehicle 100 may be slid to be inserted into the inside of the left driveshaft 210 of another vehicle 200. This is the same even in the case where the connection shaft 130 of the vehicle 100 has been provided inside the left driveshaft 110 of the vehicle 100. The wheel detecting sensor 140 may use a camera, a radar transceiver module, etc.

Meanwhile, in an exemplary embodiment of the present invention, as in FIG. 1, the connection shaft 130 is provided at the right driveshaft 120, and slid to the outside of the vehicle 100 to be inserted into and coupled to the inside of the left driveshaft 210 of another vehicle 200 when the vehicle 100 is coupled to another vehicle 200. More, when the connection shaft 130 of the vehicle 100 is inserted into and coupled to the inside of the left driveshaft 210 of another vehicle 200, the right driveshaft 120 of the vehicle 100 and the left driveshaft 210 of another vehicle 200 are lifted upwards so that the right wheel portion 121 of the vehicle 100 and the left wheel portion 211 of another vehicle 200 may be spaced from the ground surface. In FIG. 1, looking at the state where the vehicle and another vehicle have been connected, the left wheel portion and the right wheel portion of the vehicle and the left wheel portion and the right wheel portion of another vehicle are placed on the same line. In the instant case, when the vehicle 100 and another vehicle 200 are connected to perform coupling traveling, four wheel portions may contact with the ground surface on the same line, deteriorating the steering performance during the coupling traveling of the vehicle 100 and another vehicle 200. To prevent the above, in an exemplary embodiment of the present invention, the right driveshaft 120 of the vehicle 100 and the left driveshaft 210 of another vehicle 200 are lifted upwards so that the right wheel portion 121 of the vehicle 100 and the left wheel portion 211 of another vehicle 200 may be spaced from the ground surface. As a result, the left wheel portion 111 of the vehicle 100 connected to the left driveshaft 110 of the vehicle 100 and the right wheel portion 221 of another vehicle 200 connected to the right driveshaft 220 of another vehicle 200 contact with the ground surface. Therefore, only two wheel portions contact with the ground surface on the same line, enhancing the steering performance.

Furthermore, in an exemplary embodiment of the present invention, the connection shaft 130 is provided at the left driveshaft 110, and slid to the outside of the vehicle 100 to be inserted into and coupled to the inside of the right driveshaft 220 of another vehicle 200 when the vehicle 100 is coupled to another vehicle 200. More, when the connection shaft 130 is inserted into and coupled to the inside of the right driveshaft 220 of another vehicle 200, the left driveshaft 110 of the vehicle 100 and the right driveshaft 220 of another vehicle 200 are lifted upwards so that the left wheel portion 111 of the vehicle 100 and the right wheel portion 221 of another vehicle 200 may be spaced from the ground surface. Likewise even in the instant case, when the vehicle 100 and another vehicle 200 are connected to each other to perform coupling traveling, four wheel portions contact with the ground surface on the same line, deteriorating the steering performance during the coupling traveling of the vehicle 100 and another vehicle 200. To prevent the above, the left driveshaft 110 of the vehicle 100 and the right driveshaft 220 of another vehicle 200 are lifted upwards so that the left wheel portion 111 of the vehicle 100 and the right wheel portion 221 of another vehicle 200 may be spaced from the ground surface.

Meanwhile, as in FIG. 2, FIG. 3 and FIG. 4, in an exemplary embodiment of the present invention, the wheel detecting sensor 140 may be provided in plural at each of the left wheel portion 111 and the right wheel portion 121 of the vehicle 100, and may detect whether the driveshafts have been aligned with each other or the spacing distance therebetween by mutually transmitting and receiving an electronic signal between the corresponding wheel detecting sensors when the vehicle 100 is coupled to another vehicle 200. The wheel detecting sensor 140 may be provided in plural at each of the left wheel portion 111 and the right wheel portion 121 of the vehicle 100. Therefore, the wheel detecting sensor 140 may detect whether the driveshafts have been aligned with each other or the spacing distance therebetween by mutually transmitting and receiving the electronic signal between the corresponding wheel detecting sensors when the vehicle 100 is coupled to another vehicle 200. Hereinafter, the case where the connection shaft 130 has been provided inside the right driveshaft 120 of the vehicle 100 will be described. The connection shaft 130 slides to the outside of the vehicle 100 from the inside of the right driveshaft 120 of the vehicle 100 to be inserted into and coupled to the inside of the left driveshaft 210 of another vehicle 200 when the vehicle 100 is coupled to another vehicle 200. In the instant case, the right driveshaft 120 of the vehicle 100 and the left driveshaft 210 of another vehicle 200 should be aligned with each other to be placed on the same line. Furthermore, the spacing distance between the right driveshaft 120 of the vehicle 100 and the left driveshaft 210 of another vehicle 200 should be a certain distance or less so that the connection shaft 130 of the vehicle 100 may be inserted into the inside of the left driveshaft 210 of another vehicle 200. Therefore, the electronic signal is mutually transmitted and received between the plurality of wheel detecting sensors 140 provided at the right wheel portion 121 of the vehicle 100 and the plurality of wheel detecting sensors 240 provided at the left wheel portion 211 of another vehicle 200 to detect whether the driveshafts have been aligned with each other or the spacing distance therebetween is formed. This is the same even in the case where the connection shaft has been provided inside the left driveshaft 110 of the vehicle 100. Meanwhile, the wheel detecting sensor 140 may be provided with a radar transceiver module, etc. so that the electronic signal may be mutually transmitted and received between the wheel detecting sensors.

More, as in FIG. 4, the plurality of wheel detecting sensors 140 may have the same angle formed between the adjacent wheel detecting sensors on the left wheel portion 111 and the right wheel portion 121 of the vehicle 100. FIG. 4 is a diagram illustrating that a plurality of wheel detecting sensors are provided at the right wheel portion of the vehicle. FIG. 4 illustrates five wheel detecting sensors 140a, 140b, 140c, 140d, 140e in total. The plurality of wheel detecting sensors 140 provided in the vehicle mutually transmit and receive the electronic signal to or from the plurality of wheel detecting sensors 240 provided in another vehicle 200 to detect whether the driveshafts have been aligned with each other or the spacing distance therebetween is formed. In the instant case, as in FIG. 4, angles formed between the five wheel detecting sensors 140 may be equally formed. For example, the wheel detecting sensors 140 are mounted so that the angle formed between the wheel detecting sensor "140a" and the wheel detecting sensor "140b" and the angle formed between the wheel detecting sensor "140b" and the wheel detecting sensor "140c" are the same with respect to the connection shaft 130. In the instant case, five wheel detecting sensors 240 are also provided in total at the left wheel portion 211 of another vehicle 200 to mutually transmit and receive the electronic signal between the wheel detecting sensor 140 of the vehicle 100 and the wheel detecting sensor 240 of another vehicle 200. In the instant case, although the plurality of wheel detecting sensors 240 of another vehicle 200 have not been illustrated, the five wheel detecting sensors 240a, 240b, 240c, 240d, 240e in total are matched with the plurality of wheel detecting sensors 140a, 140b, 140c, 140d, 140e of the vehicle 100, respectively. Therefore, the wheel detecting sensor 140a of the vehicle 100 and the wheel detecting sensor 240a of another vehicle 200 are corresponded to each other, and This also applies to the remaining wheel detecting sensors 140b, 140c, 140d, 140e of the vehicle 100 and the remaining wheel detecting sensors 240b, 240c, 240d, 240e of another vehicle 200. In the instant case, the plurality of wheel detecting sensors 140 of the vehicle 100 mutually transmit and receive the electronic signal to or from the plurality of wheel detecting sensors 240 of another vehicle 200 matched therewith, respectively. When five distances spaced between the five wheel detecting sensors 240 of another vehicle 200 with which the five wheel detecting sensors 140 of the vehicle 100 are matched, respectively, are all the same, the right driveshaft 120 of the vehicle 100 and the left driveshaft 210 of another vehicle 200 have been aligned with each other, such that there is no possibility to interfere with the left wheel portion 211 of another vehicle 200 even if the connection shaft 130 of the vehicle 100 slides to the outside of the vehicle 100 for fastening to another vehicle 200. As such, the plurality of wheel detecting sensors 140, 240 provided in the vehicle 100 and another vehicle 200 detects whether the spacing distance between the right driveshaft 120 of the vehicle 100 and the left driveshaft 210 of another vehicle 200 is equal to or smaller than a certain distance. Therefore, it may be determined whether the connection shaft 130 of the vehicle 100 may be slid to be inserted into and coupled to the inside of the left driveshaft 210 of another vehicle 200. This is also the same even in the case where the connection shaft 130 of the vehicle 100 has been provided inside the left driveshaft 110 of the vehicle 100.

Meanwhile, FIG. 5 is a diagram illustrating an example for explaining the present invention, and the present invention is not limited to five wheel detecting sensors. Therefore, it is possible to detect whether the driveshaft of the vehicle and the driveshaft of another vehicle have been aligned with each other or the spacing distance therebetween through a plurality of wheel detecting sensors other than five. For example, two wheel detecting sensors or three wheel detecting sensors may detect whether the driveshaft of the vehicle and the driveshaft of another vehicle have been aligned with each other or the spacing distance therebetween is formed.

Meanwhile, as in FIGS. 2 and 5, the present invention may further include an integrated control portion 150 for controlling the operation of the left driveshaft 110, the right driveshaft 120, or the connection shaft 130 connected to an actuator coupled to the integrated control portion 150 to selectively move the connection shaft 130, and determining whether the driveshafts have been aligned with each other or the spacing distance therebetween via the wheel detecting sensor 140.

The actuator of the connection shaft 130 may include an electrical apparatus such as a motor, a mechanical apparatus such as linkage or gear mechanism, and a pneumatic device but is not limited thereto.

The integrated control portion 150 according to an exemplary embodiment of the present invention may include a non-volatile memory configured to store data relating to an algorithm configured to control the operation of various components of the vehicle or software instructions for reproducing the algorithm, and a processor configured to perform the operation described below by use of the data stored in the memory. Herein, the memory and the processor may be implemented as a separate chip. Alternatively, the memory and the processor may be implemented as a single chip integrated with each other. The processor may take the form of one or more processors.

More, when the connection shaft 130 has been provided at the right driveshaft 120 of the vehicle 100, the integrated control portion 150 may control the operations of the left driveshaft 110 and the right driveshaft 120 of the vehicle 100 so that the right driveshaft 120 of the vehicle 100 and the left driveshaft 210 of another vehicle 200 are aligned with each other when the vehicle 100 is coupled to another vehicle 200. Furthermore, when the connection shaft 130 has been provided at the left driveshaft 110 of the vehicle 100, the integrated control portion 150 may control the operations of the left driveshaft 110 and the right driveshaft 120 of the vehicle 100 so that the left driveshaft 110 of the vehicle 100 and the right driveshaft 220 of another vehicle 200 are aligned with each other when the vehicle 100 is coupled to another vehicle 200.

For example, if the vehicle 100 approaches another vehicle 200 when the vehicle 100 is coupled to another vehicle 200, the integrated control portion 150 controls the operations of the left driveshaft 110 and the right driveshaft 120 of the vehicle 100 so that the driveshafts of the vehicle 100 and another vehicle 200 are aligned with each other. Describing the case where the connection shaft 130 has been provided at the right driveshaft 120 of the vehicle 100, the vehicle 100 controls the rotation speeds of the left driveshaft 110 and the right driveshaft 120 while approaching the left side of another vehicle 200 so that the right driveshaft 120 of the vehicle 100 and the left driveshaft 210 of another vehicle 200 are aligned with each other when the vehicle 100 has been adjacent to the left side of another vehicle 200. This is the same even in the case where the connection shaft 130 has been provided at the left driveshaft 110 of the vehicle 100.

Meanwhile, the integrated control portion 150 may control so that the connection shaft 130 of the vehicle 100 slides to the outside of the vehicle 100 to be inserted into and coupled to the inside of the driveshaft of another vehicle 200 adjacent to the side thereof only when the driveshafts of the vehicle 100 and another vehicle 200 have been aligned with each other via the wheel detecting sensor 140. The case where the connection shaft 130 of the vehicle 100 has been provided at the right driveshaft 120 of the vehicle 100 will be described. For example, if the connection shaft 130 of the vehicle 100 slides to the outside of the vehicle 100 when the right driveshaft 120 of the vehicle 100 and the left driveshaft 210 of another vehicle 200 are not placed on the same line, there is the possibility of damaging each due to the interference between the connection shaft 130 of the vehicle 100 and the left wheel portion 211 or the vehicle body of the left side of another vehicle 200. As such, there is the possibility of causing a serious an accident caused by the interference if the vehicle 100 and another vehicle 200 are traveling. To prevent the above, the present invention is configured so that the connection shaft 130 of the vehicle 100 slides to the outside of the vehicle 100 only when the right driveshaft 120 of the vehicle 100 and the left driveshaft 210 of another vehicle 200 have been aligned with each other via the wheel detecting sensor 140. This is the same even in the case where the connection shaft 130 of the vehicle 100 has been provided at the left driveshaft 110 of the vehicle 100.

Meanwhile, the integrated control portion 150 may control so that the connection shaft 130 of the vehicle 100 slides to the outside of the vehicle 100 to be inserted into and coupled to the inside of the driveshaft of another vehicle 200 adjacent to the side thereof only when the spacing distance between the driveshafts of the vehicle 100 and another vehicle 200 is equal to or smaller than a certain distance via the wheel detecting sensor 140. The case where the connection shaft 130 of the vehicle 100 has been provided at the right driveshaft 120 of the vehicle 100 will be described. For example, when the distance between the right driveshaft 120 of the vehicle 100 and the left driveshaft 210 of another vehicle 200 is too long, the connection shaft 130 of the vehicle 100 may not be inserted into the inside of the left driveshaft 210 of another vehicle 200 even if the connection shaft 130 of the vehicle 100 slides to the outside of the vehicle 100. To solve the above, the connection shaft 130 of the vehicle 100 slides to the outside of the vehicle 100 only when the spacing distance between the right driveshaft 120 of the vehicle 100 and the left driveshaft 210 of another vehicle 200 is equal to or smaller than the certain distance. This is the same even in the case where the connection shaft 130 of the vehicle 100 has been provided at the left driveshaft 110 of the vehicle 100.

As such, referring to FIGS. 2 and 5, when the vehicle 100 has the operating authority, the integrated control portion 150 may control the operations of the left driveshaft 110, 210 and the right driveshaft 120, 220 of the vehicle 100 and another vehicle 200 when the vehicle 100 is coupled to another vehicle 200. In an exemplary embodiment of the present invention, the vehicle 100 and another vehicle 200 may be connected to each other to perform coupling traveling. Meanwhile, in the instant case, it is possible to match the passenger of the vehicle with the passenger of another vehicle through a social network, a mobile app, an online platform, etc. As such, the passenger of the vehicle 100 and the passenger of another vehicle 200 may determine in advance a person who has the operating authority. Meanwhile, the operating authority may be changed by the communication between the passenger of the vehicle 100 and the passenger of another vehicle 200 even during traveling.

Meanwhile, when the vehicle 100 has the operating authority, the integrated control portion 150 of the vehicle 100 may control the operations of the left driveshaft 110 and the right driveshaft 120 of the vehicle 100, and the left driveshaft 210 and the right driveshaft 220 of another vehicle 200 when the vehicle 100 is coupled to another vehicle 200. Therefore, when the passenger of the vehicle 100 steers with the operating authority, the operations of the left driveshaft 110 and the right driveshaft 120 of the vehicle 100, and the left driveshaft 210 and the right driveshaft 220 of another vehicle 200 are controlled together.

Furthermore, if another vehicle 200 is traveling when the vehicle 100 is coupled to another vehicle 200, the integrated control portion 150 may equally keep the rotation speeds of the left driveshaft 210 and the right driveshaft 220 of another vehicle 200 and control the rotation speeds of the left driveshaft 110 and the right driveshaft 120 of the vehicle 100 so that the driveshafts of the vehicle 100 and another vehicle 200 are aligned with each other. The rotation speeds of the left driveshaft 210 and the right driveshaft 220 of another vehicle 200 are kept equally when another vehicle 200 is traveling. As such, the vehicle 100 controls the rotation speeds of the left driveshaft 110 and the right driveshaft 120 of the vehicle 100 while approaching the side of another vehicle 200 so that the driveshafts of the vehicle 100 and another vehicle 200 are aligned with each other when the vehicle 100 is positioned at the side of another vehicle 200.

Furthermore, the integrated control portion 150 may control so that the connection shaft 130 of the vehicle 100 slides to the outside of the vehicle 100 to be inserted into and coupled to the inside of the driveshaft of another vehicle 200 adjacent to the side thereof only when the vehicle 100 and another vehicle 200 may perform the straight traveling together for a certain distance or a certain time. When the connection shaft 130 of the vehicle 100 slides to the outside of the vehicle 100 for fastening the vehicle 100 to another vehicle 200, there is the possibility that the connection shaft 130 of the vehicle 100 interferes with the side of another vehicle 200 when the vehicle 100 or another vehicle 200 performs curve traveling without performing the straight traveling. To prevent the above, the integrated control portion 150 controls so that the connection shaft 130 of the vehicle 100 slides to the outside of the vehicle 100 only when the vehicle 100 and another vehicle 200 may perform the straight traveling together for the certain distance or the certain time. For the present purpose, the information on whether the vehicle 100 and another vehicle 200 may perform the straight traveling together for the certain distance or the certain time may be obtained by use of a front-view camera, a GPS, etc. provided in the vehicle 100 and another vehicle 200.

According to the mobility connection system of the present invention, it is possible to perform the coupling traveling by coupling the vehicle with another vehicle.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A mobility connection system, including:
    a first driveshaft and a second driveshaft having a hollow shaft shape in a vehicle, and connected to a first wheel portion and a second wheel portion of the vehicle, respectively;
    a connection shaft slidably provided inside the first driveshaft or inside the second driveshaft of the vehicle, so that the connection shaft is configured to slide to an outside of the vehicle to be inserted into and coupled to an inside of a driveshaft of another vehicle which is adjacent to a side of the vehicle when the vehicle is laterally coupled to another vehicle; and
    a wheel detecting sensor provided at at least one of a first side or a second side of the vehicle, and configured for detecting when one of the first and second driveshafts of the vehicle and the driveshaft of another vehicle face each other and are aligned with each other or a spacing distance is formed therebetween while the vehicle is configured to be coupled to another vehicle.

2. The mobility connection system according to claim 1, wherein the driveshaft of another vehicle includes a first driveshaft, and
    wherein the connection shaft is provided at the second driveshaft of the vehicle, and configured to slide to the outside of the vehicle to be inserted into and coupled to an inside of the first driveshaft of another vehicle when the vehicle is coupled to another vehicle.

3. The mobility connection system according to claim 2, wherein when the connection shaft has been inserted into and coupled to the inside of the first driveshaft of another vehicle, the second driveshaft of the vehicle and the first driveshaft of another vehicle are lifted upwards so that the second wheel portion of the vehicle and a first wheel portion of another vehicle are spaced from a ground surface.

4. The mobility connection system according to claim 1, wherein the driveshaft of another vehicle includes a second driveshaft, and
    wherein the connection shaft is provided at the first driveshaft of the vehicle, and configured to slide to the outside of the vehicle to be inserted into and coupled to an inside of the second driveshaft of another vehicle when the vehicle is coupled to another vehicle.

5. The mobility connection system according to claim 4, wherein when the connection shaft has been inserted into and coupled to the inside of the second driveshaft of another vehicle, the first driveshaft of the vehicle and the second driveshaft of another vehicle are lifted upwards so that the first wheel portion of the vehicle and a second wheel portion of another vehicle are spaced from a ground surface.

6. The mobility connection system according to claim 1, wherein the wheel detecting sensor is provided in plural at each of the first wheel portion and the second wheel portion of the vehicle, and an electronic signal is mutually transmitted and received between corresponding wheel detecting sensors to detect when the one of the first and second driveshafts of the vehicle and the driveshaft of another vehicle are aligned with each other or the spacing distance is formed therebetween when the vehicle is coupled to another vehicle.

7. The mobility connection system according to claim 6, wherein the plurality of wheel detecting sensors are mounted on the first wheel portion and the second wheel portion of the vehicle and have same angles formed between adjacent wheel detecting sensors.

8. The mobility connection system according to claim 6, further including an controller configured for controlling an operation of the first driveshaft, the second driveshaft, or the connection shaft of the vehicle, and for determining when the one of the first and second driveshafts of the vehicle and the driveshaft of another vehicle are aligned with each other or the spacing distance is formed therebetween via the wheel detecting sensor.

9. The mobility connection system according to claim 8,
wherein the driveshaft of another vehicle includes a first driveshaft, and
wherein the connection shaft is provided at the second driveshaft of the vehicle, and the controller is configured to control operations of the first driveshaft and the second driveshaft of the vehicle so that the second driveshaft of the vehicle and the first driveshaft of another vehicle are aligned with each other when the vehicle is coupled to another vehicle.

10. The mobility connection system according to claim 8,
wherein the driveshaft of another vehicle includes a second driveshaft, and
wherein the connection shaft is provided at the first driveshaft of the vehicle, and the controller is configured to control operations of the first driveshaft and the second driveshaft of the vehicle so that the first driveshaft of the vehicle and the second driveshaft of another vehicle are aligned with each other when the vehicle is coupled to another vehicle.

11. The mobility connection system according to claim 8,
wherein the controller is configured to control so that the connection shaft of the vehicle slides to the outside of the vehicle to be inserted into and coupled to the inside of the driveshaft of another vehicle which is disposed adjacent to the side of the vehicle when the one of the first and second driveshafts of the vehicle and the driveshaft of another vehicle are detected to have been aligned with each other via the wheel detecting sensor.

12. The mobility connection system according to claim 8,
wherein the controller is configured to control so that the connection shaft of the vehicle slides to the outside of the vehicle to be inserted into and coupled to the inside of the driveshaft of another vehicle which is disposed adjacent to the side of the vehicle when the spacing distance between the one of the first and second driveshafts of the vehicle and the driveshaft of another vehicle is equal to or smaller than a predetermined distance.

13. The mobility connection system according to claim 8,
wherein the driveshaft of another vehicle includes a first driveshaft and a second driveshaft, and
wherein when the vehicle has an operating authority, the controller is configured to control operations of the first driveshaft and the second driveshaft of the vehicle and the first driveshaft and the second driveshaft of another vehicle while the vehicle is coupled to another vehicle.

14. The mobility connection system according to claim 13,
wherein when another vehicle is traveling while the vehicle is coupled to another vehicle, the controller is configured to keep rotation speeds of the first driveshaft and the second driveshaft of another vehicle equally, and is configured to control rotation speeds of the first driveshaft and the second driveshaft of the vehicle so that the first and second driveshafts of the vehicle and the first and second driveshafts of another vehicle are aligned with each other.

15. The mobility connection system according to claim 14,
wherein the controller is configured to control so that the connection shaft of the vehicle slides to the outside of the vehicle to be inserted into and coupled to the inside of one of the first and second driveshaft of another vehicle which is disposed adjacent to the side of the vehicle while the vehicle and another vehicle perform straight traveling together for a predetermined distance or a predetermined time.

* * * * *